No. 891,623. PATENTED JUNE 23, 1908.
C. B. LAZENBY.
ENGINE STARTER.
APPLICATION FILED AUG. 7, 1907.
2 SHEETS—SHEET 2.
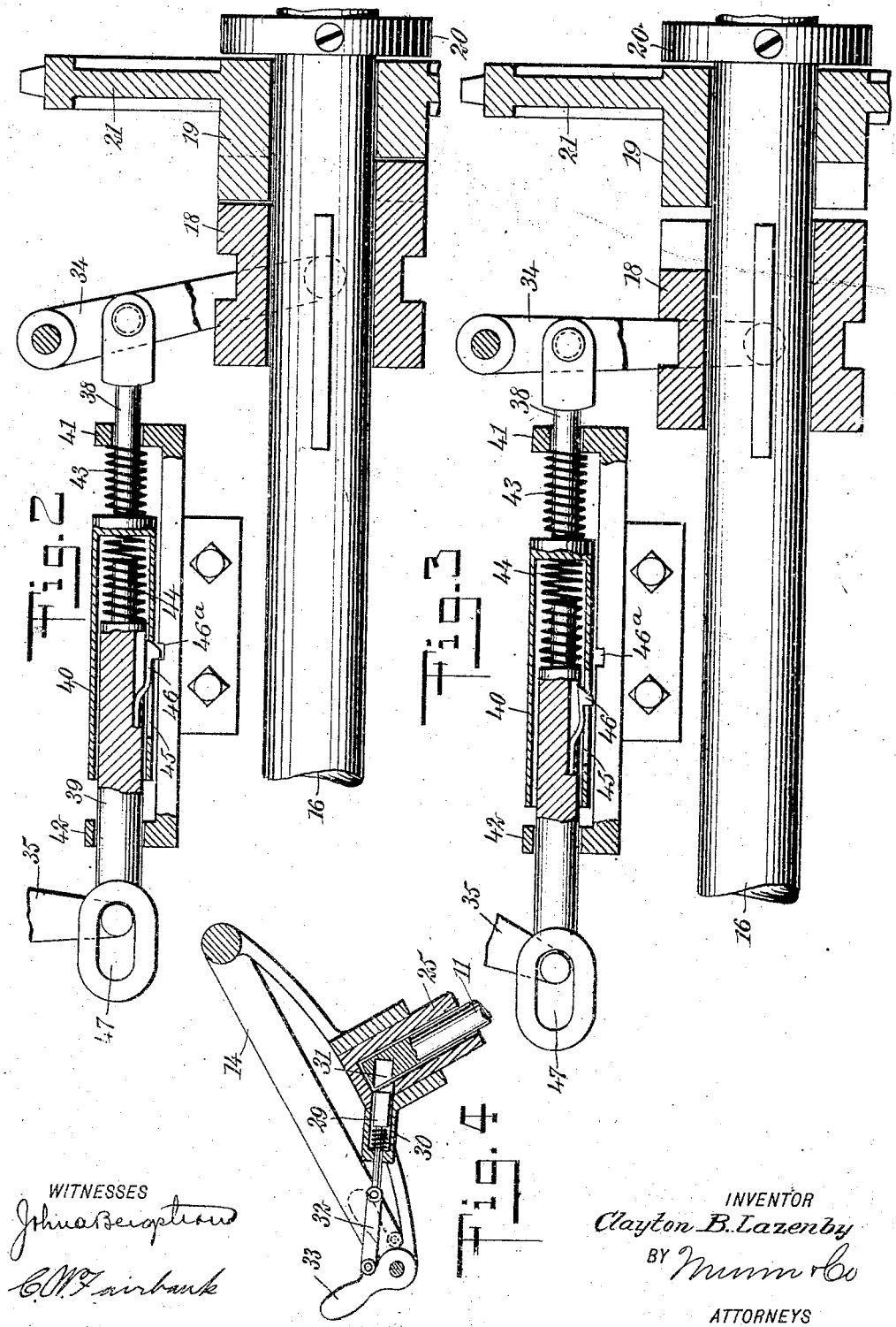
WITNESSES
INVENTOR
Clayton B. Lazenby
BY Munn & Co
ATTORNEYS

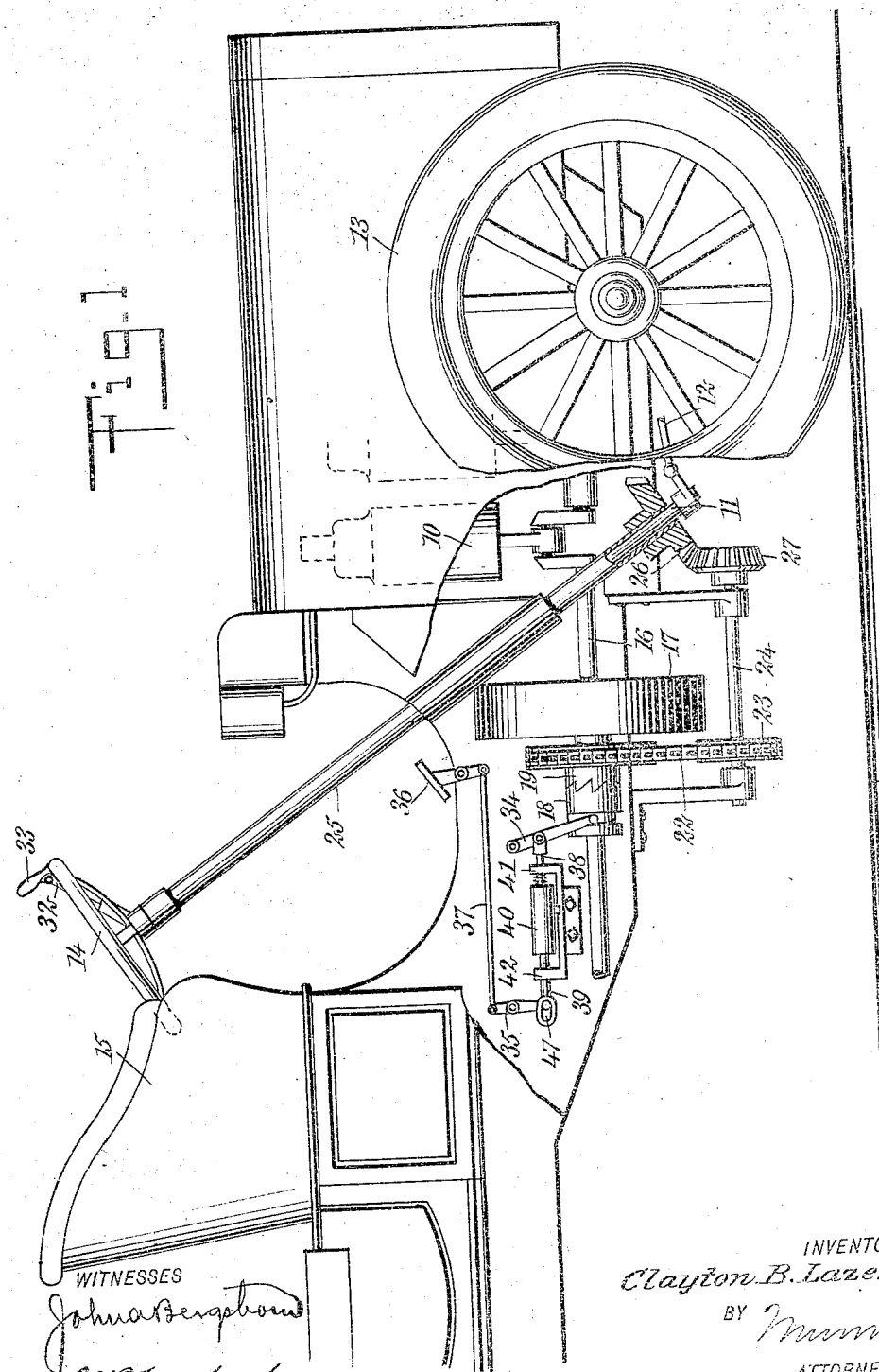

UNITED STATES PATENT OFFICE.

CLAYTON BLISS LAZENBY, OF CHICAGO, ILLINOIS.

ENGINE-STARTER.

No. 891,623.  Specification of Letters Patent.  Patented June 23, 1908.

Application filed August 7, 1907. Serial No. 387,490.

*To all whom it may concern:*

Be it known that I, CLAYTON BLISS LAZENBY, a citizen of the United States, and a resident of Chicago, in the county of Cook and State of Illinois, have invented a new and Improved Engine-Starter, of which the following is a full, clear, and exact description.

This invention relates to certain improvements in engine starters, and more particularly to an engine starter especially adapted for use upon a motor vehicle, and so designed as to be readily connected to the steering mechanism and operated therefrom.
The invention also involves means whereby the starting mechanism and the steering gear are automatically detached from operative engagement with the engine after the starting of said engine is accomplished.
Reference is to be had to the accompanying drawings, forming a part of this specification, in which similar characters of reference indicate corresponding parts in all the figures, and in which Figure 1 is a side elevation of a portion of a vehicle having a starting mechanism constructed in accordance with my invention; Fig. 2 is a detail section through the clutch and operating mechanism therefor with the parts in the position they occupy when the starter is being employed; Fig. 3 is a section similar to Fig. 2, but showing the parts in inoperative or detached position; and Fig. 4 is a detail section showing one means employed for locking the starting and steering mechanism together.

My improved mechanism is adapted for starting any form of internal combustion engine, and is especially designed for starting such an engine when the latter is mounted upon a motor vehicle.

In the drawings I have illustrated a portion of a vehicle having a multiple cylinder engine 10 disposed at the front portion thereof, and having a steering column 11 disposed in the customary position with its lower end provided with suitable arm and link connections 12 to the front wheels 13 of the vehicle and with a steering wheel 14 at the upper end and disposed adjacent the front seat 15 of the vehicle. The engine shaft 16 extends backward from the engine to the rear portion of the vehicle for transmitting motion to the rear wheels and is provided with the usual fly wheel 17.

All of the parts above referred to are substantially identical with those commonly employed in various forms of motor vehicles, and the mechanism involving my invention is so designed as to be readily adaptable to the common forms of these parts.

Upon the drive shaft 16 of the engine I provide a clutch including two collars 18 and 19, the former being slidably mounted upon the shaft but non-rotatable in respect thereto, and the other being rotatably mounted but held from longitudinal movement by any suitable mechanism, as, for instance, a collar 20. The engaging surfaces of the two collars are provided with teeth, whereby the rotation of the collar 19 in one direction will cause the simultaneous rotation of the collar 18 and the shaft keyed thereto. One of the collars, 19, is provided with mechanism whereby it may be manually-rotated, and the other collar, 18, is provided with mechanism whereby it may be moved longitudinally to engage with the collar 19. The mechanism for rotating the collar 19 preferably includes a sprocket wheel 21 carried by said collar and connected by a chain 22 leading to a sprocket wheel 23 upon an auxiliary shaft 24. This shaft is supported in any suitable bearings extending downward from the vehicle body and one end of the shaft extends to a point adjacent the steering column or rod 11. Surrounding the column or steering rod 11, there is provided a sleeve 25, so constructed as to be rigidly locked to the column at the upper end thereof, and operatively connected to the shaft 24 at its lower end by suitable gearing, as, for instance, bevel gears 26 and 27.

In the specific form illustrated, the sleeve 25 is rigidly secured to the steering wheel 14, and the locking mechanism comprises a bolt 29 slidably mounted within a boss 30 carried by the wheel and adapted to enter a recess 31 in the end of the steering column or rod 11. The outer end of the rod 29 is connected by a link 32 to a handle 33 pivoted adjacent the periphery of the wheel, and so constructed that when moved to a position at an angle to the wheel, the bolt 29 is drawn outward and out of the recess 31 in the column; while when swung inward to the position illustrated in dotted lines in Fig. 4, that is, to a position substantially in the plane of the wheel, the bolt 29 is forced into the recess 31 and the sleeve 25 and column 11 are rigidly locked together. By means of this mechanism the bolt may be withdrawn from engagement with the steering column and the steering wheel employed for rotating the collar 19 of the clutch, without altering the position of the front wheels or any of the parts of the steering mechanism proper. While the engine is running the column would be locked to the sleeve 25, and thus as the steering mechanism is operated to guide the machine the collar 19 would also be rotated, but as the collar 18 would be out of engagement with the collar 19 at this time, it would have no effect upon the shaft of the engine.

For throwing the collar 18 into engagement with the collar 19 and for automatically separating said collars when the engine is started, I preferably provide the mechanism illustrated in detail in Figs. 2 and 3. The collar 18 is provided with an annular groove in its periphery which engages with the yoke arms of a lever 34, the opposite end of which is pivoted to the vehicle body or frame. A second lever 35 is also pivoted to the vehicle frame or body and has one end connected to the first-mentioned lever by a telescopic link, and the end connected to certain operating mechanism adapted to be controlled either by the hand or the foot. The specific mechanism illustrated comprises a pedal 36 and a connecting link 37. The telescopic link connections between the levers 34 and 35 preferaby comprise two rods 38 and 39 in alinement, the former of which is provided with an enlarged end 40 having a recess for the reception of the rod 39. The two rods are supported in suitable guides 41 and 42, and surrounding the rod 38 and engaging with the guide 41 and enlarged end 40, is a coil spring 43 tending to move the rod 38 longitudinally and pull the clutch collar 18 out of engagement with the clutch collar 19. Within the enlarged end 40 and in engagement with the end of the rod 39, is a second coil spring 44 normally tending to separate the two rods. The enlarged end 40 is provided with a slot 45 in one side thereof, and the inner rod 39 carries a spring catch 46 having a beveled end and adapted to engage in a notch 46ª in the frame supporting the guides 41 and 42. The outer end of the rod 39 is provided with a slot 47, engaged by a projection from the lever 35. In the operation of this portion of my invention, the application of pressure to the pedal 36 causes the lever 35 to force the rod 39 longitudinally and in the direction of the rod 38. As the rod 39 reaches the position indicated in Fig. 2, the catch 46 engages in the notch of the support and holds the rod against return movement. The spring 44 forces the rod 38 longitudinally against the action of the spring 43 and the collar 18 is brought into engagement with the collar 19. At this time, by rotating the steering wheel 14, motion is transmitted to the collar 19 and through the teeth to the collar 18, which being keyed to the shaft causes the rotation of the engine shaft and the starting of the engine. As soon as the engine starts, the collar 18 rotates at a faster rate than the collar 19 is rotating, thus causing the collar 18 to move laterally against the action of the spring 44 to separate the collars and permit the teeth to slip past each other. This longitudinal movement of the rod 38 by the collar 18 causes the end of the slot 45 to come into engagement with the cam end of the catch 46 and force it inward out of the notch with which it is in engagement. This releases the rod 39 and permits it to move longitudinally under the combined action of the springs 43 and 44. By means of the catch 46, it is unnecessary to hold the foot in engagement with the pedal 36 after the catch 46 locks the rod in position. As soon as the catch engages in the notch the foot is removed from the pedal 36 and the pedal is permitted to return to its former position, due to the presence of the slot 47 in the end of the rod 39 and in which the end of the lever 35 engages. The slot forms with the lever lost motion connections and permits of a free and unrestricted return movement of the rod 39 after the pedal has been previously returned to its former position.

Having thus described my invention, I claim as new and desire to secure by Letters Patent:

1. In a motor vehicle, an engine having a shaft, a collar rotatably mounted upon said shaft, steering mechanism, means for rotating said collar from said steering mechanism, and independently-operated means for locking said collar to said shaft.

2. In a motor vehicle, two concentric members, one of said members comprising a rod and the other of said members comprising a sleeve, independent means for connecting said rod and sleeve to separate mechanisms of the vehicle, and a wheel connected to one of said members and carrying a longitudinally-movable bolt adapted to engage with the other member and cause their simultaneous rotation by said wheel.

3. In a motor vehicle, a steering rod, a sleeve surrounding the same, engine starting mechanism connected to said sleeve at one end thereof, a steering wheel connected to said sleeve at the opposite end thereof, a longitudinally-movable bolt carried by said wheel and movable into or out of engagement with said steering rod, and a handle carried by said wheel for controlling said bolt.

4. In a motor vehicle, an engine having an engine shaft, a sleeve, manually-operated means carried by said sleeve at one end thereof for rotating the same, a collar rotatably mounted on said engine shaft, gearing connecting said collar and said sleeve, whereby the collar is rotated by the rotation of the sleeve, and independently-operated mechanism for locking said collar to said shaft and causing the simultaneous rotation of the latter.

5. An engine starter, comprising a clutch mounted upon the engine shaft, manually-controlled means for rotating said clutch, means independent thereof for throwing said clutch into operative position, and means for disengaging said clutch and holding it in inoperative position upon the starting of the engine.

6. An engine starter, comprising a clutch mounted upon the engine shaft, manually-controlled means for rotating said clutch, resilient means independent thereof for throwing said clutch into operative position, and means for automatically throwing said clutch out of operation and holding it in inoperative position upon the starting of the engine.

7. An engine starter, comprising a collar loosely mounted upon the engine shaft, means for rotating said collar, a second collar non-rotatably mounted upon said shaft, but movable longitudinally into engagement with the first-mentioned collar, the adjacent surfaces of said collars presenting engaging teeth, and means for moving said collar longitudinally, said means including a link formed of two rods telescopic in respect to each other and normally held apart by the action of a spring.

8. In combination, an engine shaft, and an engine starter for said shaft, said starter including a clutch and a longitudinally-movable link for operating said clutch, said link comprising two rods telescopically mounted, means for moving one of said rods longitudinally, a catch for preventing the return of said rod, and means whereby the other rod engages with said catch to liberate the same and permit the longitudinal movement of both rods and the disengagement of the clutch.

9. In combination, an engine shaft, and an engine starter for said shaft, said starter including a clutch and a longitudinally-movable link for operating said clutch, said link comprising two rods telescopically mounted, a spring for moving said rods away from each other, one of said rods being operatively connected to the clutch and the other of said rods being connected to the controlling mechanism, a catch carried by the last-mentioned rod and serving to prevent the return of said rod after it has been moved to bring the clutch into operation, and means carried by the other of said rods for disengaging said catch and permitting the return of said rod and the disengagement of the clutch.

10. In an engine starter, a clutch, an engine shaft, a collar loosely mounted thereon, means for rotating said collar, a clutch collar adapted to engage with the first-mentioned collar, and means for moving said clutch collar longitudinally, said means comprising a pedal, a link of variable length and comprising two telescopic members, and lost motion connections between one of said members and said pedal.

In testimony whereof I have signed my name to this specification in the presence of two subscribing witnesses.

CLAYTON BLISS LAZENBY.

Witnesses:
E. J. HOLDEN,
F. J. BEACH.